United States Patent
Chameroy et al.

(10) Patent No.: US 9,320,381 B2
(45) Date of Patent: Apr. 26, 2016

(54) GASKET FOR A UTENSIL FOR COOKING FOOD AND A UTENSIL PROVIDED WITH SUCH A GASKET

(75) Inventors: Eric Chameroy, Veronnes (FR); Michel Pierre Cartigny, Mirebeau-sur-Beze (FR)

(73) Assignee: SEB S.A., Ecully (FR)

( * ) Notice: Subject to any disclaimer, the term of this patent is extended or adjusted under 35 U.S.C. 154(b) by 975 days.

(21) Appl. No.: 13/518,410

(22) PCT Filed: Dec. 21, 2010

(86) PCT No.: PCT/FR2010/052856
§ 371 (c)(1),
(2), (4) Date: Sep. 5, 2012

(87) PCT Pub. No.: WO2011/077036
PCT Pub. Date: Jun. 30, 2011

(65) Prior Publication Data
US 2012/0318795 A1    Dec. 20, 2012

(30) Foreign Application Priority Data

Dec. 23, 2009   (FR) ...................... 09 59553

(51) Int. Cl.
*B65D 51/16* (2006.01)
*A47J 27/08* (2006.01)
*B65D 53/00* (2006.01)

(52) U.S. Cl.
CPC  *A47J 27/08* (2013.01); *B65D 53/00* (2013.01)

(58) Field of Classification Search
CPC ....... A47J 27/00; A47J 27/08; A47J 27/0804; A47J 27/0806; A47J 27/0808; A47J 27/0811; A47J 27/0813; A47J 27/0815; A47J 27/0817; A47J 36/06; A47J 36/00; A47J 36/10; B65D 53/00; B65D 53/02; B65D 53/04; F16J 15/00; F16J 15/02; F16J 15/021
USPC ......... 220/217, 221, 222, 223, 224, 225, 226, 220/228, 378, 304; 215/344, 341, 343, 345
See application file for complete search history.

(56) References Cited

U.S. PATENT DOCUMENTS 2,399,115 A * 4/1946 Hansen et al. ................ 220/298
2,600,714 A * 6/1952 Wenscott et al. ............. 220/298
(Continued)

FOREIGN PATENT DOCUMENTS

DE    202008011482 U1   12/2008
EP         0684001 A1   11/1995
WO         0143605 A1    6/2001

*Primary Examiner* — Steven A. Reynolds
*Assistant Examiner* — Javier A Pagan
(74) *Attorney, Agent, or Firm* — The Webb Law Firm

(57) ABSTRACT

Provided is a sealing gasket for a utensil for cooking food under pressure, the utensil includes a vessel on which a lid is designed to be mounted; a sealing gasket interposed between the vessel and the lid for sealing the utensil in operation; and centering means designed to center the gasket relative to the vessel and to the lid. The sealing gasket includes a peripheral band and a peripheral under-band extending under the peripheral band and extending it, and centering means provided in or disposed in the gasket in such a manner that said centering means can come to be interposed between the lid and the vessel while the lid is being put into place on the vessel so as to form a centering abutment. The centering means being formed by a plurality of local extra-thickness zones, situated on the inside face of said peripheral under-band and designed to come into contact with the vessel. The utensil is a pressure cooker.

14 Claims, 5 Drawing Sheets

(56) References Cited

U.S. PATENT DOCUMENTS

| | | | |
|---|---|---|---|
| 4,685,587 A * | 8/1987 | Sebillotte | 220/316 |
| 5,641,085 A * | 6/1997 | Lonbardo | 220/203.12 |
| 5,927,183 A * | 7/1999 | Lee | 99/337 |
| 6,116,151 A * | 9/2000 | Fickert et al. | 99/337 |
| 6,695,319 B1 * | 2/2004 | Anota et al. | 277/628 |
| 6,877,633 B2 * | 4/2005 | Niese | 220/315 |
| 7,637,206 B2 * | 12/2009 | Seurat Guiochet et al. | 99/337 |
| 2003/0209865 A1 * | 11/2003 | Park | 277/641 |
| 2005/0166908 A1 * | 8/2005 | Cartigny et al. | 126/20 |
| 2007/0295221 A1 * | 12/2007 | Seurat Guiochet et al. | 99/337 |
| 2009/0101643 A1 * | 4/2009 | Rhetat et al. | 220/203.01 |
| 2011/0011274 A1 * | 1/2011 | Thelen et al. | 99/337 |
| 2014/0305947 A1 * | 10/2014 | Lee | 220/573.1 |

* cited by examiner

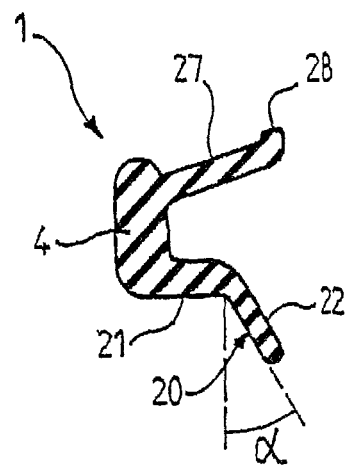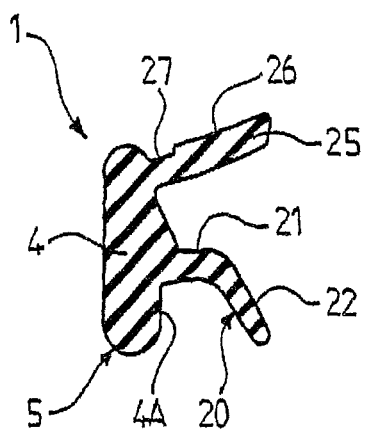
FIG.3　　　　FIG.4
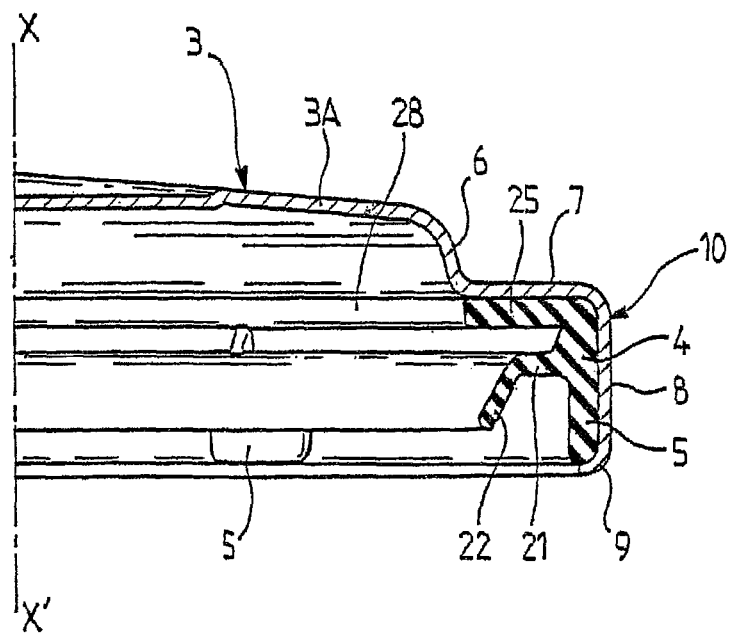
FIG.5

GASKET FOR A UTENSIL FOR COOKING FOOD AND A UTENSIL PROVIDED WITH SUCH A GASKET

TECHNICAL FIELD

The present invention relates to the general technical field of pressure cooking utensils for cooking food under pressure in an atmosphere full of steam, e.g. utensils known as "steam cookers" or "pressure cookers", and relates more particularly to sealing gaskets designed to be put in place in such utensils so as to provide sealing between the inside and the outside of the utensil when it is in operation.

The present invention thus relates to a sealing gasket for a utensil for cooking food under pressure, said utensil comprising:
- a vessel on which a lid is designed to be mounted;
- a sealing gasket interposed between the vessel and the lid for sealing the utensil; and
- centering means designed to center the gasket relative to the vessel and to the lid.

The present invention also relates to a utensil for cooking food under pressure, which utensil is equipped with or is suitable for being equipped with a sealing gasket of the invention.

The present invention also relates to a V-shaped lip gasket for a pressure cooking utensil, said gasket being designed to be mounted in the lid of a cooking utensil so as to provide sealing between said lid and the vessel of the cooking utensil when it is in operation, said gasket further including a peripheral band.

PRIOR ART

It is already known that a sealing gasket, e.g. made of an elastomer material, can be used for sealing a utensil for cooking food under pressure, regardless of the type of the utensil in question, be it, in non-limiting manner, a pressure cooker having a locking bar; bayonet fittings; jaws; or an internal-mount lid.

Such a gasket is generally placed in the lid by suitable means such that, while the lid is being put into place on the vessel of the utensil, the gasket comes to bear against the vessel and provide sealing between the inside and the outside of the cooking enclosure while the utensil is being brought up to pressure and throughout the cooking cycle.

Thus, for example, gaskets of the "rope seal" type are known that are used in pressure cookers having locking bars. Gaskets of the "lip seal" type are also known that are generally channel-section and that differ essentially by the positions of their lips inside the utensil. There thus exists a first type of lip-seal gasket, having optionally symmetrical lips, the lips generally being mutually parallel and disposed in a horizontal plane in the lid while the gasket is being put into place in the lid. A second type of lip-seal gasket is also known, having optionally symmetrical lips, and with which, putting the gasket into place in the lid results in its lips being positioned substantially vertically, and generally mutually parallel.

In any event, putting the lid into place on the vessel causes the lip(s) of the gasket to be put under compression with a view to sealing the utensil and to enabling enable it to be brought up to pressure and to operate.

Although generally satisfactory, such gaskets suffer from certain drawbacks. Thus, they are often difficult to put into place, even though good and indeed safe operation of the pressure cooker, and in particular of bringing it up to pressure, is dependent on the gasket being put into place accurately and appropriately. It is not infrequent for improper placement of the gasket to give rise to a defect in sealing between the lid and the vessel, generating a leak and defective pressure build-up in the utensil, or indeed causing fluid to spurt out from it.

Furthermore, in addition to the difficulty of putting the gasket into place accurately in the lid, known systems suffer from an additional drawback resulting from the need to provide a system for centering the lid on the vessel.

Centering systems are necessary to enable the gasket to take up an accurate and pre-established position between the vessel and the lid, fully accurate centering of the lid on the vessel enabling the gasket to perform fully the various sealing functions for which it is designed.

It is observed that, in practice, systems for assisting with putting the gasket into place on the lid and systems for assisting with centering the lid on the vessel interfere with putting the gasket into place, and above all require complex and costly manufacturing means to be implemented. For horizontal-placement lip-seal gaskets, use is generally made of punched-out portions or through holes in the edge of the lid in order to facilitate putting the gasket into place and centering the lid on the vessel, the punched-out portions or holes also acting as abutments and as reference-mark elements.

Those elements hinder putting the gasket into place and can even give rise to positioning errors being made by the user. Finally, they require suitable industrial tools, an appropriate production-line organization, and a specific process for checking the parts. For vertical-placement lip-seal gaskets, use is made, for example, of rolling the inside edge of the lid to form a rolled rim, which complicates manufacture of the lid and requires a specific technology. In summary, the currently available technical solutions are not fully satisfactory and need to be improved.

SUMMARY OF THE INVENTION

Objects assigned to the invention are therefore to remedy the various above-mentioned drawbacks and to propose a novel sealing gasket for a utensil for cooking food under pressure that is particularly simple to put into place and that is particularly effective, while also enabling the lid to be centered relative to the vessel of the utensil.

Another object of the invention is to propose a novel sealing gasket for a utensil for cooking food under pressure that procures sealing that is improved by means that are particularly simple and inexpensive.

Another object of the invention is to propose a novel sealing gasket for a utensil for cooking food under pressure that procures sealing by means of reduced forces.

Another object assigned to the invention is to propose a novel sealing gasket for a utensil for cooking food that makes it possible to improve safety and, in particular overpressure safety, in the event of improper use.

The objects assigned to the invention are achieved by means of a sealing gasket for a utensil for cooking food under pressure, said utensil comprising:
  a vessel on which a lid is designed to be mounted;
  a sealing gasket interposed between the vessel and the lid
    for sealing the utensil and for enabling it to operate; and
  centering means designed to center the gasket relative to
    the vessel and to the lid.
  said sealing gasket being characterized in that it comprises a peripheral band and a peripheral under-band extending under the peripheral band and extending it, and centering means provided in or disposed in the gasket in such a manner that said centering means can come to be interposed between the lid and the vessel while the lid is being put into place on the vessel so as to form a centering abutment, said centering means being formed by a plurality of local extra-thickness zones, situated on the inside face of said peripheral under-band and designed to come into contact with the vessel.

The objects assigned to the invention are also achieved by means of a V-shaped lip gasket for a pressure cooking utensil, which gasket includes a peripheral band and centering means designed to center the gasket relative to the vessel and relative to the lid of the cooking utensil, said gasket being characterized in that it includes a peripheral under-band extending under the peripheral band and extending it, and in that the centering means are formed by a plurality of local extra-thickness zones, situated on the inside face of said peripheral under-band and designed to come into contact with the vessel to form a centering abutment.

BRIEF DESCRIPTION OF THE DRAWINGS

Other objects and advantages of the invention appear in more detail from the following description with reference to the accompanying drawings, given merely by way of non-limiting illustration, and in which:

FIGS. 3 and 4 are cross-section views respectively on lines and IV-IV of FIG. 1, showing the corresponding cross-sections of a sealing gasket;

FIG. 5 is a fragmentary cross-section view of a preferred embodiment of a gasket mounted inside a lid of a cooker for cooking food under pressure;

DETAILED DESCRIPTION OF THE INVENTION

Figure 1:
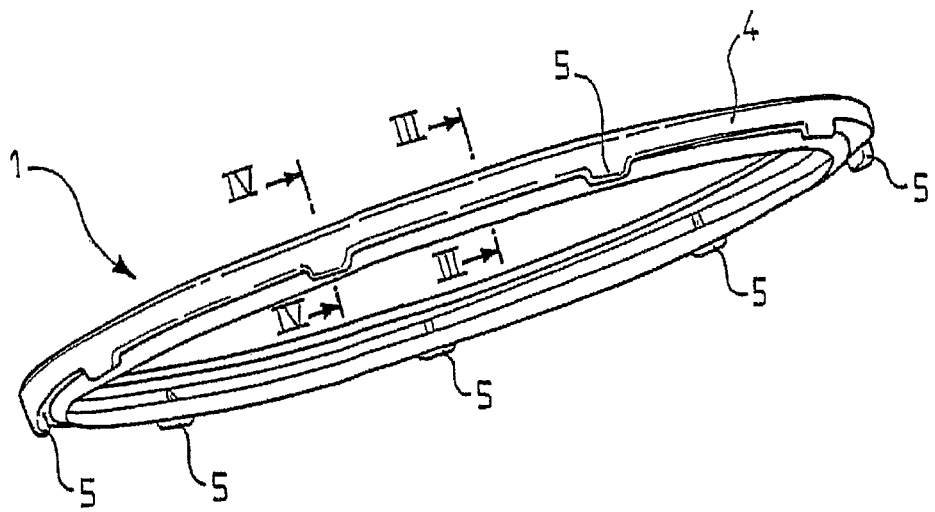
FIG. 1 is a perspective view of a preferred embodiment of a sealing gasket.

FIGS. 1 to 8 show a sealing gasket 1 designed to be mounted and positioned in a utensil for cooking food under pressure, of the steam cooker or pressure cooker type, including a vessel 2 on which a lid 3 is designed to be mounted.

As is well known, the gasket 1 is made out of a deformable plastics material, of the elastomer type, e.g. silicone.

Also in known manner, the utensil for cooking food, e.g. a pressure cooker, is provided with a locking/unlocking device (not shown in the figures) for locking/unlocking the lid 3 relative to the vessel 2. The locking/unlocking device may be of any known type, e.g. having locking bars, bayonet fittings or jaws, it also being possible for the pressure cooker to be of the type having an internal-mount lid or of the manhole type without the type or the nature of the locking leading to any limitation on the scope of the invention.

In known manner, the utensil of the invention for cooking food under pressure is also provided with the various safety devices (not shown in the figures) that are appropriate and required for enabling utensils of this type to operate with full safety. In particular it is provided with one or more overpressure safety and regulation valves, and optionally with utensil-opening safety systems.

As shown in the figures, the sealing gasket 1 is interposed between the vessel 2 and the lid 3 for sealing the utensil and for enabling it to operate. The gasket 1 is designed to act in such a manner that the inside of the enclosure formed by the vessel 2 and by the lid 3 is isolated in sealed manner from its outside environment, when the lid 3 is in place on the vessel and is locked, and the sealing procured by the gasket should enable pressure to build up inside the utensil so that it can reach its normal operating pressure and perform a normal and full cooking cycle.

In the example shown in the figures, the sealing gasket 1 of the invention is preferably of circular shape, with a view to matching a food-cooking utensil that is of complementary and also circular shape, it being understood that the general geometrical shape of the gasket may be different, and, for example, it may be substantially oval, square, or of some other shape, as necessary in order to match the geometrical shape of the food-cooking utensil in question.

As shown in the figures, the food-cooking utensil of the invention is provided with centering means 5 designed to center the gasket 1 relative to the vessel 2 and to the lid 3.

As shown, the gasket 1 of the invention is in the general shape of an annular gasket made up of a peripheral band 4, e.g. of substantially constant cross-section, forming the core of the gasket 1 and having the function of providing sealing as one of its essential functions.

The lid 3 is preferably provided with a convex and raised central zone 3A that is continued radially outwards, going towards the outside of the lid 3, by a downwardly extending flank 6 itself continued by an annular flat 7 that is itself followed by a downwardly extending annular rim 8 that is preferably substantially flat and vertical, which annular rim is terminated by an inwardly rolled end segment 9. The annular flat 7 thus co-operates with the downwardly extending rim 8 and the rolled end segment 9 to define an annular channel 10 inside which the peripheral band 4 and the centering means 5 are designed to be received. Naturally, the respective dimensions and geometrical shapes of the annular channel 10 and of the peripheral band 4 and of the centering means 5 are appropriate and are complementary so that the gasket is held, so that the sealing is provided, and so that the centering of the lid 3 on the vessel 2 is obtained.

Figure 6:
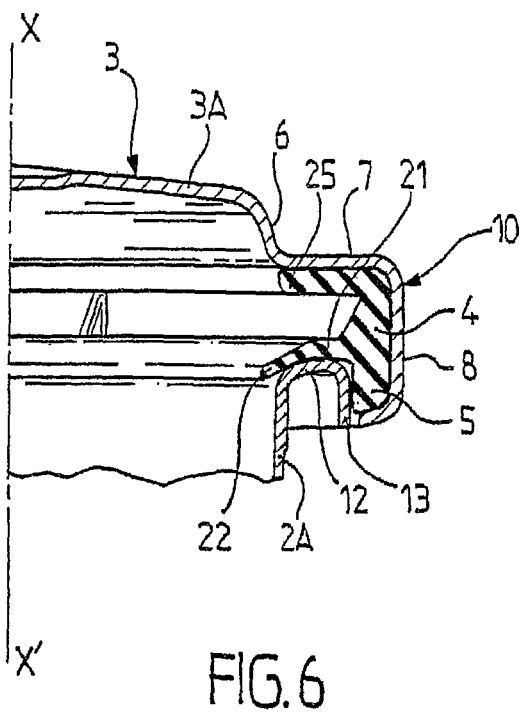
FIG. 6 is a fragmentary cross-section view of a preferred embodiment of the invention, showing the positioning of a gasket in a utensil for cooking food under pressure.

To this end, and in the preferred variant of the invention shown in the figures, and in particular in FIG. 6, the vessel 2 has walls 2A rising substantially vertically from the bottom (not shown) of the utensil, said walls 2A extending towards their top ends via a vessel rim 12 extending substantially radially outwards relative to the main axis of symmetry (X-X') of the utensil. Advantageously, the vessel rim 12 is substantially flat and is inclined slightly relative to the horizontal as shown in the figures so as to define a slightly conical shape facing towards the center of the utensil. However, it may be substantially horizontal without going beyond the ambit of the invention. Advantageously, the vessel rim 12 is extended outwards by a substantially vertical downwardly extending rim 13. In accordance with the invention, the centering means 5 are provided in or are disposed in the gasket 1 in such a manner that said centering means 5 can come to be interposed between the lid 3 and the vessel 2 while the lid is being put into place on the vessel 2 so as to form a centering abutment. This feature enables the gasket 1 to be held in position on its inside periphery and on its outside periphery against the vessel 2 and against the lid 3.

In a first variant embodiment (not shown in the figures), the peripheral band 4 can be extended at its bottom portion by an under-band over its entire periphery, forming the centering means 5 over a constant height. In this variant, the total height of the cross-section of the peripheral band and of the centering means 5 corresponds substantially to the height of the downwardly extending annular rim 8, the thickness of the centering means 5 corresponding, for example, substantially to the width of the end segment 9, or advantageously being greater than said width so that, while the lid 3 is being put into place on the vessel 2 and is docking therewith, the bottom end portion of the gasket 1, and, in this example, the centering means 5 come into abutment, via their peripheral inside face(s), against the downwardly extending rim 13.

In an advantageous variant of the invention, the sealing gasket 1 thus includes a peripheral band 4 held or designed to be held in the annular channel 10 of the lid 3, the centering means 5 extending radially from said peripheral band 4 and under said peripheral band so that they can form abutment means enabling the lid 3 and the vessel 2 to be centered relative to each other while also ensuring that the gasket 1 is positioned properly.

In a particularly advantageous version of the invention, and as shown in particular in FIGS. 1 to 6, it is not necessary for the centering means 5 to extend over a peripheral length identical to the peripheral length of the peripheral band 4 in order to obtain the desired centering effect. In other words, the centering means 5 extend radially from the peripheral band 4 over portions of length along the peripheral band 4 in discontinuous manner in order to form a plurality of sectors S (FIG. 2) along which the total height of the gasket 1 corresponds substantially to the total height of the annular channel 10 so that, within said sectors S, the inside faces 4B of the centering means 5 can be put into abutment against the vessel 2, and advantageously against the downwardly extending rim 13, in order to obtain a centering effect.

As shown, and in an advantageous version that is in no way limiting, the annular gasket may, for example, have nine sectors S defining nine individual centering means 5.

As also shown in the figures, the centering means 5 are advantageously formed integrally with the peripheral band 4 or, in alternative manner (not shown in the figures), they may be secured to said peripheral band 4. It is possible to consider providing a peripheral band 4 of height that is constant over its periphery (and less than the height of the downwardly extending rim 8), and to using adhesive bonding, insertion, or clipping, or indeed any equivalent means to secure parts that are distinct from the gasket 1 and that form the centering means 5, without going beyond the ambit of the invention.

Advantageously, the sealing gasket 1 is provided with a lower lip 20 extending from the peripheral band 4 and designed to come to bear in sealed manner against the vessel 2, and advantageously against the vessel rim 12, while the lid 3 is being put into place.

In particularly advantageous manner, the lower lip 20 has a geometrical profile that is adapted to come to fit against the vessel rim 12 with a force that is as small as possible but nevertheless sufficient to procure optimum sealing. To this end, and in advantageous manner, the lower lip 20 has at least a first portion 21 and at least a second portion 22 extending on from the first portion, the two portions being inclined relative to each other. It is thus possible to obtain the desired effect facilitating good sealing by the inside face of the lower lip 20 bearing against the vessel rim with the lower lip 20 deforming inwards to a very small extent only, the vertical force opposing closure of the lid 3 also being minimized.

In a particularly advantageous version, shown in FIGS. 3 and 4, the first portion 21 extends substantially horizontally and radially towards the center of the lid 3 and towards the axis X-X' from the peripheral band 4, when the gasket 1 is in the rest position in the lid 3, said first portion 21 being extended by the second portion 22 that is inclined towards the bottom of the vessel 2 (FIG. 5) at an angle $\alpha$ (FIG. 3) of about 35° relative to the vertical, and, for example, lying in the range 0° to 60°.

Such an arrangement enables the gasket to provide excellent sealing between the vessel and the outside of the utensil, with a force opposing closure of the lid that is minimized.

The sealing gasket of the invention is also advantageously provided with an upper lip 25 extending from the peripheral band 4, substantially from the top end of said peripheral band 4, said upper lip 25 being designed to come into sealed abutment against the lid 3. More particularly, and as shown in the figures, the upper lip 25 is shaped and is of length such that it comes into sealed abutment against the inside face of the annular flat 7 and preferably substantially over its entire length. The sealing between the lid 3 and the outside of the utensil is thus provided in particularly effective manner.

Advantageously, the upper lip 25 is provided with a plurality of ribs 26 (FIG. 2) extending in a substantially radial direction relative to the axis (X-X'), said ribs 26 being spaced apart from one another, uniformly or otherwise, said ribs 26 projecting from the top face 27 of said upper lip that is designed to come into contact with the lid 3, and in particular with the inside face of the annular flat 7. Firstly, the ribs 26 form a visual reference mark facilitating identifying which way up the gasket 1 should be placed, thereby making it easier for the user to position it properly in the annular channel 10, and secondly, said ribs 26 form means facilitating leakage of air in the event that the gasket 1 is positioned abnormally, and in particular the wrong way up.

Figure 2:
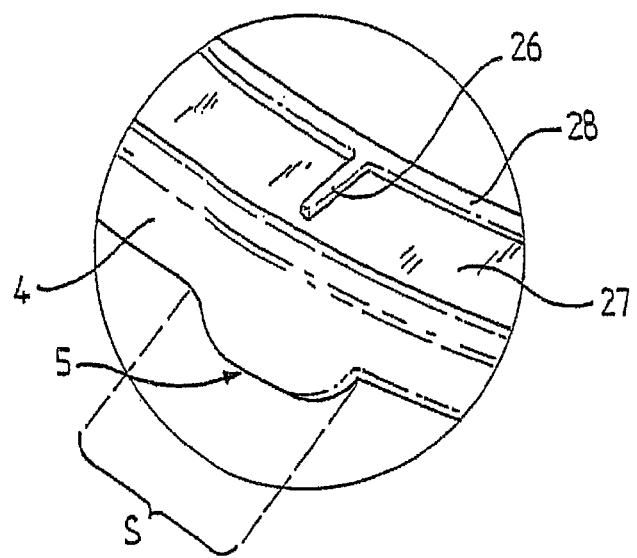
FIG. 2 is a fragmentary perspective view of an embodiment detail of a sealing gasket taken from FIG. 1.

As shown in FIG. 2, the ribs 26 may be situated substantially in register with the sectors S provided with the centering means 5, and preferably in register with the centers of said sectors. By way of a preferred variant (not shown in the figures), the ribs 26 are provided on the upper lip 25 between adjacent centering means 5.

By way of a variant that is not shown in the figures, the upper lip 25 may, instead of or in addition to the ribs 26, be provided with substantially radial grooves provided in the thickness of the upper lip 25 in such a manner as to create an uneven contact surface for contact with the inside face of the lid.

Thus, the upper lip 25 is provided over its surface with a plurality of substantially radial shapes, of the rib or of the groove type, spaced apart from one another and forming gaps on the top face of the upper lip 25 in contact with the lid.

Advantageously, at its free end segment opposite from the peripheral band 4, the upper lip 25 has a projection or a bead 28, e.g. forming an O-ring torus, for facilitating the sealing between the upper lip 25 and the lid 3.

In a preferred variant embodiment of the invention shown in FIGS. 9 to 12, the gasket is provided with a peripheral under-band 4A extending under the peripheral band 4 and extending it. As shown, the peripheral under-band 4A extends the peripheral band 4 in register with said band in such a manner that the peripheral band 4 and the peripheral under-band 4A preferably form two bands that are substantially superposed, that are situated in alignment with each other, and that have their outside faces parallel to each other.

Compared with the gasket described in FIGS. 1 to 6, the variant described in FIGS. 9 to 12 is also characterized in that the plurality of sectors S, corresponding to the centering means of the invention, is formed by a plurality of local extra-thickness zones 5A situated on the inside face 4B of said under-band 4A and designed to come into contact with the vessel 2. The local extra-thickness zones 5A thus form radial extra-thickness zones directed towards the center of the vessel 2 and extending in this direction from the inside face 4B facing the center of said vessel 2.

The local extra-thickness zones 5A are angularly distributed in substantially uniform manner along the periphery of the gasket, and, for example, there are from ten to fourteen of them.

Naturally, the local extra-thickness zones 5A may be formed integrally with the peripheral under-band 4A or be secured to said peripheral under-band 4A by any suitable means.

Figure 9:
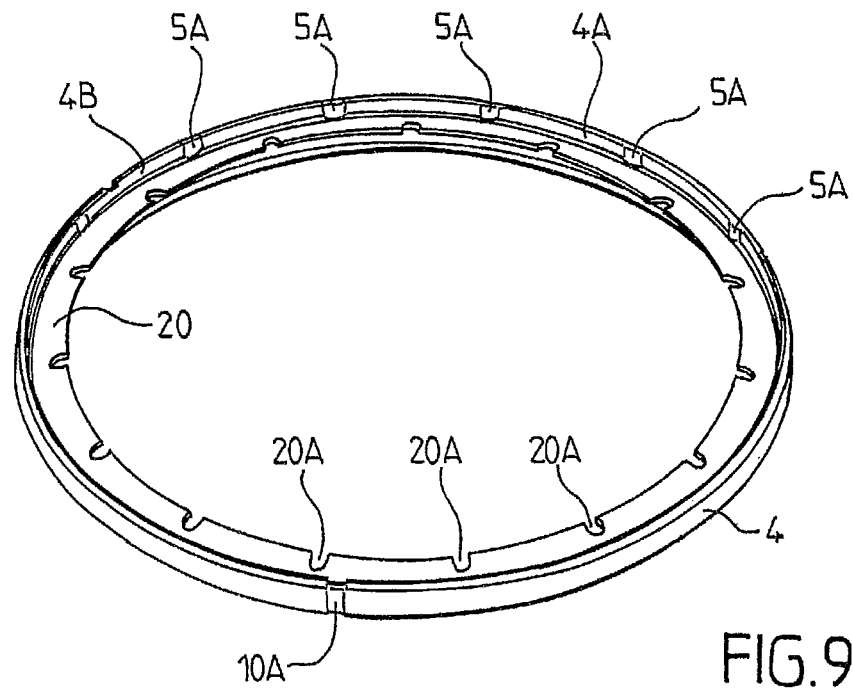
FIGS. 9 and 10 are perspective views showing an embodiment of the sealing gasket of the invention, seen respectively from above and from below.

Preferably, the local extra-thickness zones 5A are formed by a series of cylindrical domes shown in FIG. 9 and having their bases integral with or secured to the face 4B.

The invention thus relates to a V-shaped lip gasket for a pressure cooking utensil, which gasket includes a peripheral band 4, and is characterized in that it is provided with centering means extending under the peripheral band so as to come to be interposed between the lid 3 and the vessel 2 of the cooking utensil while the lid 3 is being put into place on the vessel 2 so as to form a centering abutment. The sealing gasket 1 is advantageously a gasket having two non-parallel lips that are mutually angularly oriented to form, at rest, an asymmetrical V-shape from the peripheral band 4, facilitating good sealing with minimum force. In its operating position, the lips 20 and 26 of the V-shaped gasket of the invention are substantially parallel to the bottom of the vessel 2 of the utensil, i.e. substantially horizontal.

In the preferred variant embodiment of the invention that is shown in FIGS. 9 to 12, the V-shaped lip gasket of the invention further includes a peripheral under-band 4A as described above, with local extra-thickness zones and a lower lip 20 that is provided with a plurality of notches 20A provided through the thickness of said lower lip 20 starting from the distal end 20C of said lower lip 20. The notches 20A make it possible for the gasket to creep (FIG. 11) in the event that the lid 3 deforms in the peripheral sectors of the lid 3 that extend between two adjacent jaws, in which peripheral sectors the lid is not retained by the jaws.

Figure 12:
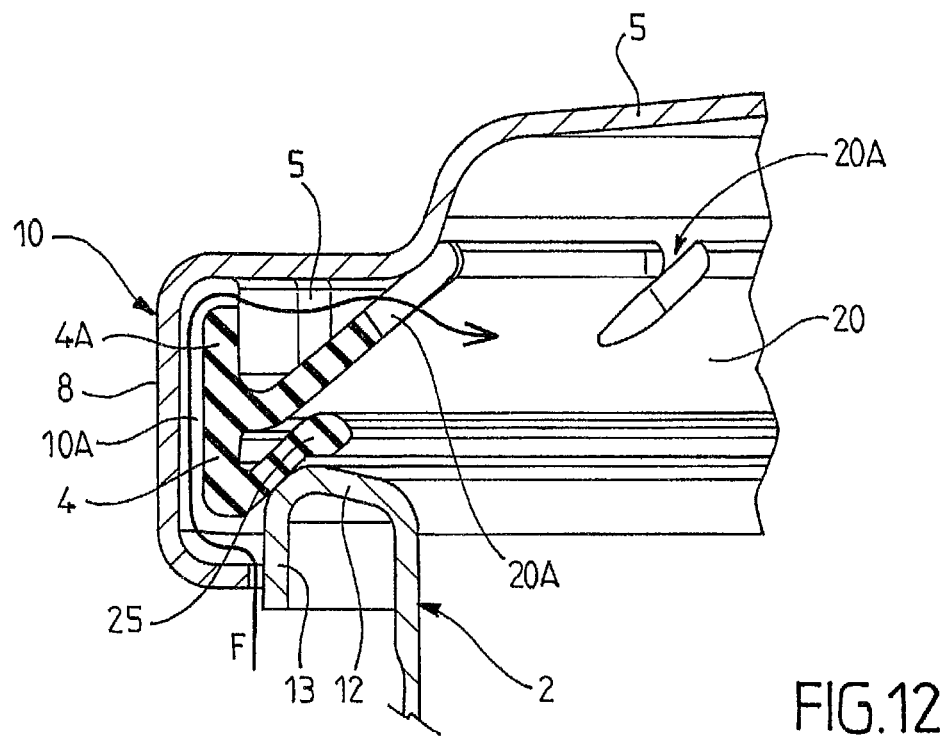
FIG. 12 is a fragmentary cross-section view showing the positioning of a gasket of the invention shown in FIGS. 9 and 10, in an abnormal wrong-way-up position in a utensil for cooking food under pressure.
Figure 10:
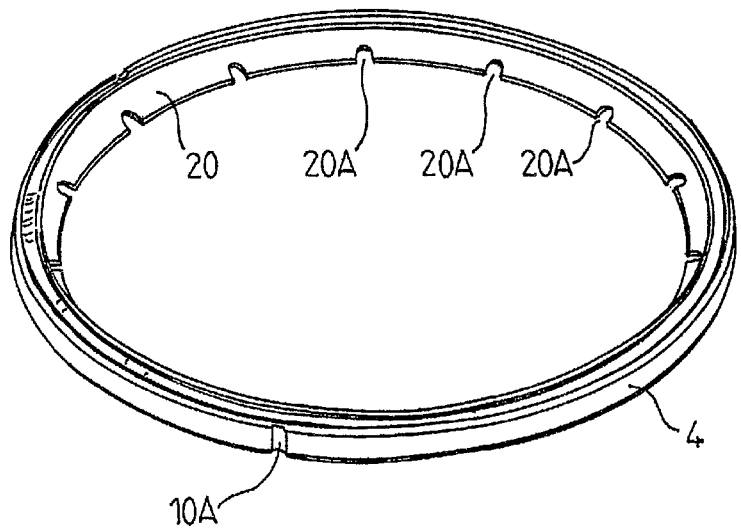
Figure 11:
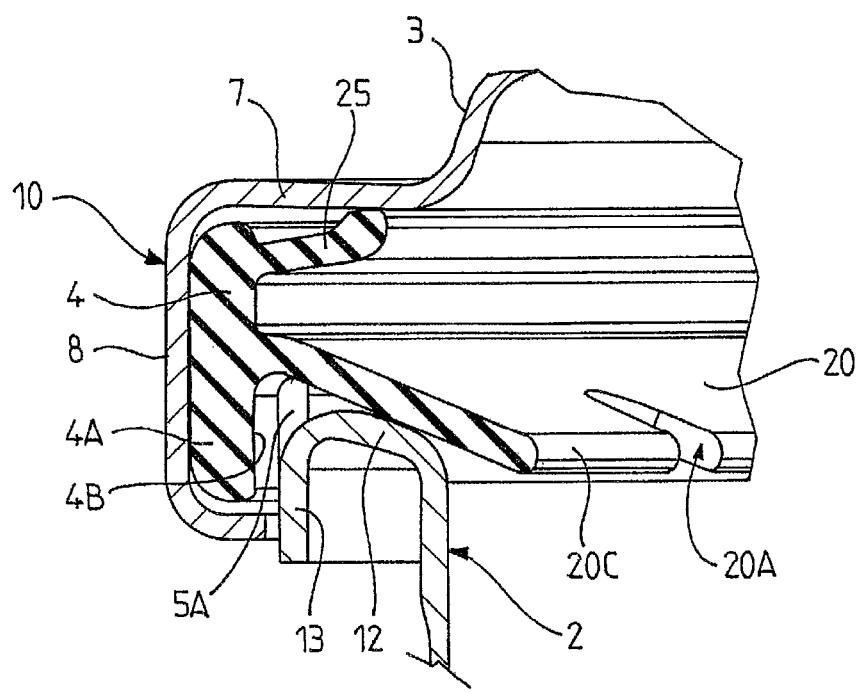
FIG. 11 is a fragmentary cross-section view showing the positioning of a gasket of the invention identical to the gasket shown in FIGS. 9 and 10.

In the event of abnormal overpressure and of malfunctioning of the utensil, the notches 20A make it possible to generate steam leakage through their cross-sections, and through a leakage zone provided between the vessel rim and the cylindrical sectors of the lid that are not retained by two adjacent jaws. The leakage zone is continued by one or more recesses 10A provided in the thickness of the peripheral band 4 and in the peripheral under-band 4A, and over their entire heights (FIGS. 9 and 12). The function of these recesses is to prevent the gasket from being mounted the wrong way up in the lid 2.

The creep notches 20A thus prevent the gasket from escaping from the vessel rim, or indeed from being extruded.

The V-shaped lip gasket of the invention is characterized in that it includes a peripheral under-band 4A extending under the peripheral band 4 and extending it, and in that the centering means 5A are formed by a plurality of local extra-thickness zones 5A situated on the inside face 4B of said peripheral under-band and designed to come into contact with the vessel.

The invention also relates to a V-shaped lip gasket for a pressure cooking utensil, which gasket includes a peripheral band 4 and centering means 5, 5A designed to center the gasket 1 relative to the vessel 2 and relative to the lid 3 of the cooking utensil, said gasket being characterized in that it includes a peripheral under-band 4A extending under the peripheral band 4 and extending it, and in that the centering means 5A are formed by a plurality of local extra-thickness zones 5A, situated on the inside face 4B of said peripheral under-band 4A and designed to come into contact with the vessel to form a centering abutment.

The gasket is characterized in that the local extra-thicknesses 5A are formed by cylindrical domes.

The shape and size characteristics of the sealing gasket 1 of the invention therefore make it possible to put it into place easily and without any risk of erroneous positioning, inside the annular channel 10, said gasket remaining inside the lid 3 by means of its outside diameter being close to the inside diameter of the lid 3. Holding the gasket inside the annular channel 10 is also facilitated by the combined height of the peripheral band 4 and of the centering means 5, disposed under the peripheral under-band 4A, which combined height enables the gasket 1 to fit snugly in the volume of the annular channel 10 (FIG. 5).

Once in place, the upper lip 25, and in particular the bead 28 forming an O-ring torus, comes to co-operate with the bottom face of the lid 3 and accurately provides the sealing between the inside and the outside of the utensil, at the lid.

While the lid 3 is being closed and locked on the vessel 2, the centering means 5 come to co-operate with the outside of the rim of the vessel 2 to provide centering between the lid 3 and the vessel 2, while also inducing excellent positioning of the sealing gasket 1 over its entire periphery relative to these two parts.

While the lid 3 is being put into place, the lower lip 20 comes naturally to bear against the vessel rim 12 with minimum deformation, making it particularly easy to close the utensil, without however reducing the sealing between the vessel and the outside of the utensil.

Thus, all of the geometrical shapes selected for the parts coming into contact with one another make it possible to procure excellent centering of the lid 3 while also making it possible to minimize the forces necessary for the utensil to be correctly closed, locked and sealed.

The gasket 1 of the invention also procures advantages while the utensil is being opened.

Figure 7:
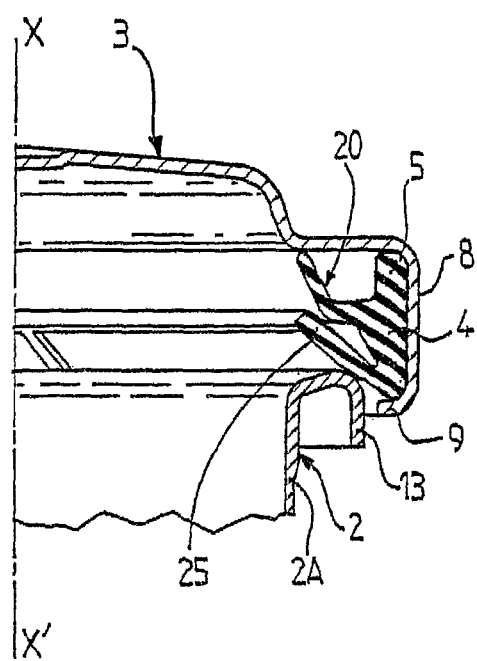
FIGS. 7 and 8 are fragmentary cross-section views showing operation of a gasket in an abnormal position inside a utensil for cooking food under pressure.
Figure 8:
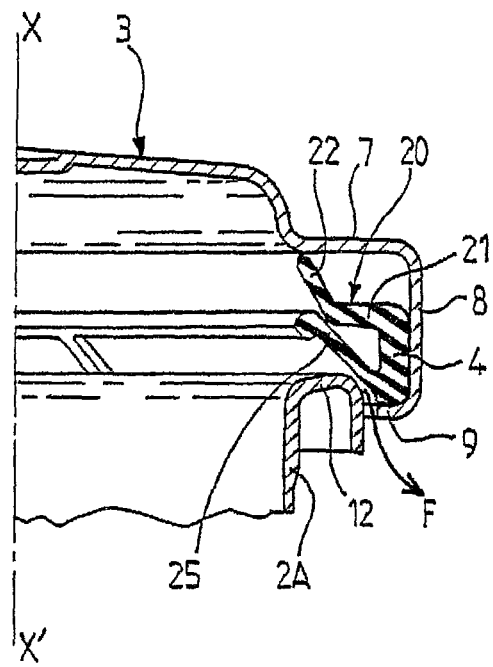

The sealing gasket 1 of the invention is also particularly advantageous insofar as it is designed to generate a major air leak from the utensil when it is positioned erroneously and, in particular, the wrong way up as shown in FIGS. 7 and 8.

In these figures, the gasket 1 has been put into place in the peripheral channel 10 the wrong way up, the upper lip 25 coming into abutment against the vessel rim 12 when the utensil is not in operation (FIG. 7), i.e. the pressure prevailing inside the utensil is substantially equivalent to atmospheric pressure.

Firstly, it can be observed that with such an assumption of malfunctioning, the forces required for closing the utensil are large insofar as it is necessary to overcome the forces resulting from the improper positioning of the lips 20, 26 of the gasket, and in particular of the lip 25, the elasticity of which opposes proper docking of the lid 3 onto the vessel.

In addition, it is observed that the ribs 26 come into abutment against the vessel rim 12, thereby leaving large leakage gaps between the various ribs 26 and firstly the top face 27 and secondly the vessel rim 12. The resulting large leakage gaps make it possible, correlatively, to generate a large leak F (FIG. 8), preventing any build-up of pressure inside the utensil, and thus procuring a high degree of safety for the user in the event that the gasket is positioned erroneously.

The gasket of the invention that is shown in FIGS. 9 to 12 is also particularly advantageous in the event that the gasket of the invention is positioned erroneously or the wrong way up.

As shown in FIG. 12, if the gasket of the invention is inadvertently placed the wrong way up, a natural leakage path F (FIG. 12) is generated, resulting from the creep notches 20A bearing against the inside face of the lid 3 and from the recesses 10A provided in the outside periphery of the gasket that forms its heel facing the annular channel 10 over its entire height, i.e. over the height of the peripheral band 4 and of the peripheral under-band 4A.

By means of this technical feature, it is possible to provide a natural leak between the heel of the gasket and the lid 2, and then through the notches 20A such that the utensil cannot be brought up to pressure when the gasket of the invention is positioned the wrong way up or abnormally.

The invention is industrially applicable to manufacturing household utensils, and in particular pressure cookers.

The invention claimed is:

1. A sealing gasket for a utensil for cooking food under pressure, said utensil comprising:
    a vessel on which a lid is designed to be mounted;
    a sealing gasket interposed between the vessel and the lid for sealing the utensil when it is in operation; and
    centering means designed to center the gasket relative to the vessel and to the lid;
    said sealing gasket being characterized in that it comprises a peripheral band and a peripheral under-band extending under the peripheral band and extending it, and centering means provided in or disposed in the gasket in such a manner that said centering means can come to be interposed between the lid and the vessel while the lid is being put into place on the vessel so as to form a centering abutment, said centering means being formed by a plurality of local extra-thickness zones, situated on the inside face of said peripheral under-band and designed to come into contact with the vessel.

2. The gasket according to claim 1, wherein the local extra-thicknesses are formed by cylindrical domes.

3. A gasket according to claim 1, wherein the centering means are formed integrally with the peripheral band or are secured to said peripheral band.

4. A gasket according to claim 2, wherein the sealing gasket is provided with a lower lip extending from the peripheral band and designed to come to bear in sealed manner against the vessel rim while the lid is being put into place.

5. A gasket according to claim 4, wherein the lower lip has at least a first portion and at least a second portion extending on from the first portion, the two portions being inclined relative to each other.

6. A gasket according to claim 5, wherein the first portion extends substantially horizontally towards the center of the lid from the peripheral band, said first portion being extended by the second portion that is inclined towards the bottom of the vessel at an angle $\alpha$ relative to the vertical, lying in the range 0° to 60°.

7. A gasket according to claim 4, wherein the lower lip is provided with a plurality of notches provided through the thickness of said lower lip, from a distal end of said lower lip, and recesses are provided in the outside periphery of the gasket over its entire height.

8. A gasket according to claim 2, wherein the sealing gasket further comprises an upper lip extending from the peripheral band and designed to come into sealed abutment against the lid.

9. A gasket according to claim 8, wherein the upper lip is provided over its surface with a plurality of substantially radial shapes, of a rib or of a groove type, spaced apart from one another and forming gaps on a top face of the upper lip in contact with the lid.

10. A gasket according to claim 8, wherein, at its end segment, the upper lip has a projection e.g. forming an O-ring torus, for facilitating the sealing between the upper lip and the lid.

11. A utensil for cooking food under pressure, which utensil is equipped with or is suitable for being equipped with a sealing gasket according to claim 1.

12. A utensil for cooking food under pressure according to claim 11, wherein the utensil is a steam cooker or a pressure cooker.

13. A V-shaped lip gasket for a pressure cooking utensil, which gasket includes a peripheral band and centering means designed to center the gasket relative to the vessel and relative to the lid of the cooking utensil, said gasket being characterized in that it includes a peripheral under-band extending under the peripheral band and extending it, and in that the centering means are formed by a plurality of local extra-thickness zones, situated on the inside face of said peripheral under-band and designed to come into contact with the vessel to form a centering abutment.

14. A gasket according to claim 13, wherein the local extra-thicknesses are formed by cylindrical domes.

* * * * *

UNITED STATES PATENT AND TRADEMARK OFFICE
CERTIFICATE OF CORRECTION

PATENT NO. : 9,320,381 B2
APPLICATION NO. : 13/518410
DATED : April 26, 2016
INVENTOR(S) : Eric Chameroy et al.

Page 1 of 1

It is certified that error appears in the above-identified patent and that said Letters Patent is hereby corrected as shown below:

Claims

Column 10, Line 26, Claim 10, after "projection" delete "e.g."

Signed and Sealed this
Twelfth Day of July, 2016

Michelle K. Lee
*Director of the United States Patent and Trademark Office*